United States Patent [19]

Leigh-Monstevens

[11] Patent Number: 4,827,834

[45] Date of Patent: May 9, 1989

[54] FOUR POINT SEAL

[75] Inventor: Keith V. Leigh-Monstevens, Troy, Mich.

[73] Assignee: Automotive Products, plc, Warwickshire, England

[21] Appl. No.: 58,781

[22] Filed: Jun. 5, 1987

[51] Int. Cl.<sup>4</sup> ............................................. F01B 31/00
[52] U.S. Cl. ................................ 92/108; 192/85 CA; 277/166; 277/235 R; 277/206 A
[58] Field of Search ............. 92/107, 108, 109, 165 R; 192/91 A, 85 CA; 277/166, 235 R, 206 A, 208, 209, 210, 212 C, 212 R, 188 R, 188 A, 164, 165

[56] References Cited

U.S. PATENT DOCUMENTS

| | | | |
|---|---|---|---|
| 2,295,678 | 9/1942 | Miller | 309/4 |
| 2,309,446 | 4/1940 | Ekkebus | 309/33 |
| 2,895,773 | 7/1959 | McConnaughey | 277/212 C |
| 2,935,349 | 5/1960 | Burch | 277/210 |
| 3,009,721 | 11/1961 | Newton et al. | 288/4 |
| 4,328,972 | 5/1982 | Albertson et al. | 277/124 |
| 4,428,590 | 1/1984 | Pippert | 277/188 |
| 4,601,374 | 7/1986 | Ladin | 192/85 CA |

FOREIGN PATENT DOCUMENTS

| | | | |
|---|---|---|---|
| 675545 | 1/1966 | Belgium | 277/212 |
| 871236 | 3/1953 | Fed. Rep. of Germany | 277/153 |
| 2654452 | 1/1976 | Fed. Rep. of Germany | 277/206 A |
| 1428571 | 1/1965 | France | 277/235 |
| 1528824 | 4/1967 | France | 277/206 A |
| 2294367 | 7/1976 | France . | |
| 760310 | 10/1956 | United Kingdom . | |
| 1069556 | 5/1967 | United Kingdom . | |
| 1437358 | 5/1976 | United Kingdom . | |

OTHER PUBLICATIONS 3 pages of brochure of Minnesota Rubber Co. entitled Fact Book and Design Guide.

Primary Examiner—Robert E. Garrett
Assistant Examiner—Thomas Denion
Attorney, Agent, or Firm—Krass & Young

[57] ABSTRACT

An annular seal of the four point type in which a pair of annular seals are provided on one side of the seal to provide an effective pressure seal for the associated pressure chamber and a further pair of seals are provided on the other side of the seal to preclude the entry of contaminants into the sealing interface. The seal is formed as an assembly including a rigid insert ring member and an annular seal member of elastomeric material having a rectangular configuration in transverse cross section defining the four separate annular sealing surfaces at each of its four corners. In one form of the invention, the annular insert member comprises a discrete ring member which is substantially totally encapsulated by the surrounding elastomeric material and in a further form of the invention the insert member is constituted by the free annular end portion of an annular piston member to which the elastomeric sealing material is bonded to form the seal assembly.

11 Claims, 2 Drawing Sheets

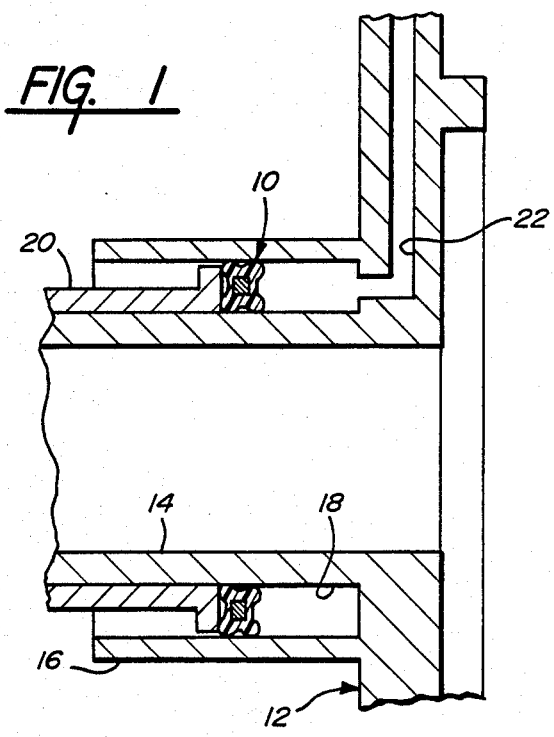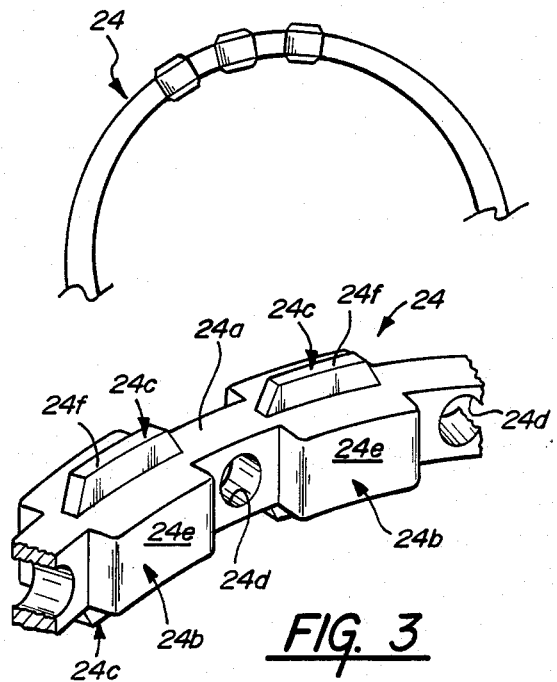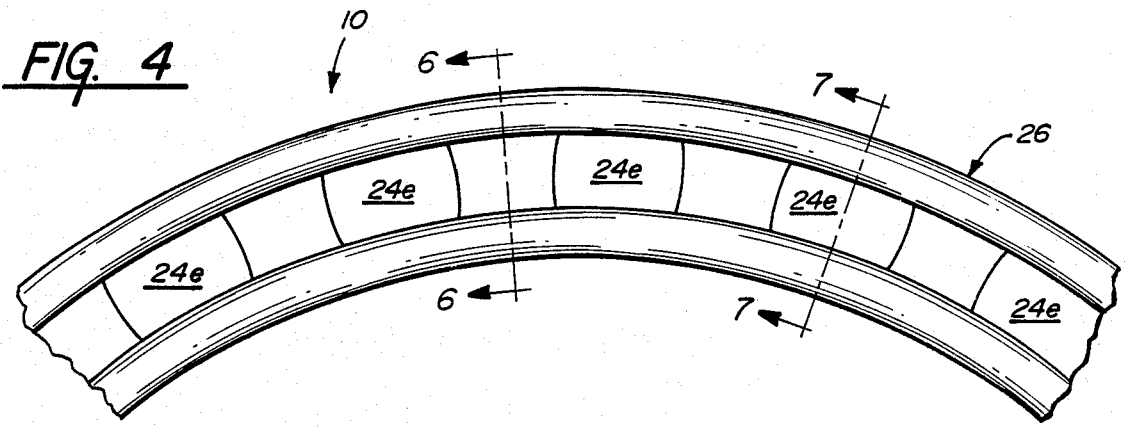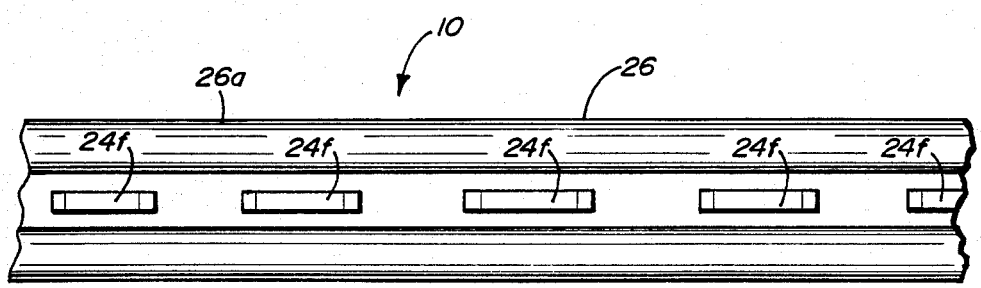

FOUR POINT SEAL

BACKGROUND OF THE INVENTION

This invention relates to four point or quad type seals.

In a four point or quad seal, the seal has a generally rectangular configuration and defines annular sealing surfaces at each of its four corners.

In a typical application, the pair of concentric annular sealing surfaces at one annular side face of the seal typically constitute a pressure seal to maintain a pressure condition in the associated piston and cylinder assembly and the two concentric sealing surfaces at the other annular side face of the seal function to keep contaminates out of the sealing interface.

Seals of this general type are especially effective in piston and cylinder environments where the first set of sealing surfaces acts to maintain the pressure in the pressure chamber of the piston cylinder and the second set of sealing surfaces preserves the sealing effectiveness Of the first set Of sealing surfaces by preventing the entry of contaminates into the sealing environment. However, seals of this type include a relatively large volume of rubber and this large volume of rubber detracts from the travel efficiency and the load efficiency of the associated piston and cylinder assembly Specifically, the axial compression or squishing occurring in the large rubber volume of the four point type seal increases the lost motion or travel of the associated cylinder assembly with a consequent derogation in the travel efficiency of the cylinder assembly. Further, the squishing of the rubber generates high friction losses which derogate the load efficiency of the cylinder assembly in the sense of reducing the load output of the assembly as compared to the load input.

SUMMARY OF THE INVENTION

This invention is directed to the provision of a four point seal which minimizes seal squish.

More particularly, this invention is directed to the provision of a four point seal which provides a relatively high travel efficiency and load efficiency of the associated cylinder assembly.

According to the invention, the seal comprises a seal assembly including an annular insert structure of rigid material and an annular seal member of elastomeric material having a generally rectangular configuration in transverse cross section and defining a separate annular sealing surface at each of its four corners with the elastomeric material bonded to and around the insert member in a manner to cover the majority of the surface area of the insert member. This arrangement preserves the sealing efficacy of the four point type seal while minimizing the volume of the elastomeric material of the seal and thereby minimizing the squish of the seal so as to in turn maximize the travel and load efficiency of the associated cylinder assembly.

According to a further feature of the invention the insert structure is a separate, discrete annular ring member and the seal member, in transverse cross section, extends substantially totally around the ring member so as to substantially encapsulate the ring member. This arrangement allows the manufacturer of a seal assembly which is specially suited for use as the sealing member in a cylinder assembly and which operates in that environment to provide effective sealing while maximizing travel efficiency and load efficiency.

In one version of the discrete ring member arrangement, the ring member includes a main body annular portion of constant axial and radial dimensions and protruberences on the main body portion at circumferentially spaced locations therearound. This arrangement allows the protruberences to interlockingly coact with the elastomeric material to provide a positive locking interrelationship as between the rigid ring member and the elastomeric material.

In another version of the discrete ring member arrangement, the ring member is of constant axial and radial dimensions throughout and includes a main body portion which, in the final seal assembly, is totally encapsulated by the elastomeric material, and a rib portion at one side of the main body portion which is exposed at its annular outboard face in the final assembly of the seal assembly.

In another embodiment of the invention, the insert structure of the seal assembly is constituted by an annular free end portion of an annular piston. This arrangement allows the provision of a subassembly constituted by the piston and the encapsulating elastomeric material and simplifies the subsequent assembly of the associated piston and cylinder assembly.

According to a further feature of this embodiment, the annular free end portion of the piston includes an annular flange portion extending radially inwardly and outwardly with respect to the main body of the piston and the seal member encapsulates the flange portion. This arrangement provides secure bonding of the elastomeric material to the piston and further allows the piston to be radially spaced from the associated annular surfaces of the piston and cylinder assembly so as to minimize friction in the piston and cylinder assembly

BRIEF DESCRIPTION OF THE DRAWINGS

FIG. 1 is a fragmentary and somewhat diagrammatic view of a piston and cylinder assembly employing a seal assembly according to the invention;

FIG. 2 is a fragmentary view of an annular insert member employed in the seal assembly of FIG. 1;

FIG. 3 is a fragmentary perspective view of the annular insert member of FIG. 2;

FIG. 4 is a fragmentary view of the seal assembly of FIG. 1;

FIG. 5 is a fragmentary top view of the seal assembly of FIG. 4;

DETAILED DESCRIPTION OF THE PREFERRED EMBODIMENTS

Figure 6:
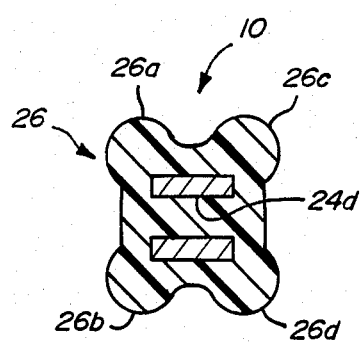
FIGS. 6 and 7 are cross sectional views taken respectively on lines 6—6 and 7—7 of FIG. 4.

The invention seal assembly 10 is seen in FIG. 1 in use in an annular hydraulic cylinder and piston assembly such for example as a slave cylinder assembly for operating the throwout bearing of a mechanical clutch wherein the assembly is disposed concentrically around the drive shaft coupling a clutch disk to the drive shaft of a gear box of a motor vehicle. The slave cylinder assembly includes a housing 12 provided with concentric tubular members 14 and 16 preferably cast integrally with housing 12. Members 14 and 16 coact to define an annular cylindrical chamber 18 and an annular piston 20 is slidably positioned in chamber 18. Seal assembly 10 is disposed in chamber 18 on one side of annular piston 20 so that hydraulic fluid introduced into the annular chamber 18 through a passageway 22 in housing 12 displaces the seal assembly 10 and piston 20 to the left, as seen in FIG. 1, thereby displacing to the left a throwout bearing mounted on the end of the annular piston. The throwout bearing engages the release fingers of the clutch of the vehicle in known manner to disengage the clutch. When the hydraulic fluid is withdrawn from chamber 18, piston 20 is allowed to be displaced to the right under the action of the clutch spring fingers and the clutch is reengaged in known manner. A slave cylinder assembly of the type seen in FIG. 1 is disclosed for example in U.S. Pat. No. 4,577,549 owned by the assignee of this application.

Seal assembly 10 includes an annular insert member 24 and an annular elastomeric member 26.

Annular insert member 24 is formed in a suitable injection molding process and is formed of a suitable plastic material such as a glass reinforced plastic or a mineral filled plastic. Insert member 24 is in the form of a ring member and includes a main body annular portion 24a of constant axial and radial dimensions, axial protruberances 24b, and radial protruberences 24c.

Axial protruberances 24b and radial protruberences 24c are provided at circumferentially spaced locations around main body portion 24a. At each circumferential location, a protruberence 24b extends in one axial direction from main body portion 24a, a second protruberence 24b extends in the other axial direction from main body portion 24a, a radial protrusion 24c extends radially outwardly from main body portion 24a, and a further radial protrusion 24c extends radially inwardly from main body portion 24a. Protruberences 24b extend for the full vertical height of annular main body portion 24a whereas radial protrusions 24c have a thickness that is only a fraction of the thickness of main body portion 24a and are centered with respect to the thickness of the main body portion. A throughbore or hole 24d is provided in main body portion 24a between each set of protruberences.

Following the injection molding of ring member 24, the ring member is coated with a suitable adhesive or bonding agent and placed in a suitable mold whereafter, in a known flashless molding process, elastomeric member 26 is molded around the insert member. In the final seal assembly as seen in FIGS. 4, 5, 6 and 7, elastomeric member 26 substantially totally encapsulates ring member 24 with the exception that the axially outer surfaces 24e of protruberances 24d are exposed in the final seal assembly and the radially upper and radially lower surfaces 24f of the radially protruberances 24c are exposed in the final seal assembly.

Figure 7:
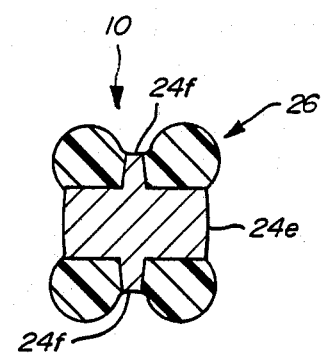

As best seen in FIGS. 6 and 7, elastomeric member 26 has a generally rectangular transverse cross section and defines separate annular sealing surfaces 26a, 26b, 26c and 26d at its four corners. In the final molded seal assembly, elastomeric member 26 is firmly and interlockingly joined to ring member 24 by the interlocking relationship of the elastomeric member with the protruberences 24b and 24c and by the interlocking passage of the material of the elastomeric member 26 through axial bores 24d in the ring member.

In use of the invention seal assembly of FIGS. 1 through 7, as seen for example in the concentric slave cylinder arrangement of FIG. 1, the sealing surfaces 26c and 26d operate to provide a pressure seal in the pressure chamber 18 and the sealing surfaces 26a and 26b operate to preclude the entry of contaminants into the sealing interface. The ring member 24 minimizes the volume of rubber in the seal assembly and thereby minimizes seal squish, with consequent improvements in travel efficiency and load efficiency of the associated cylinder assembly. Further, the ring member serves as a positive locating device for the seal assembly and restricts the range of movement of the seal assembly by providing an overall stiffness or rigidity for the seal assembly while yet allowing the elastomeric material to continue to effectively perform its sealing functions.

Figure 8:
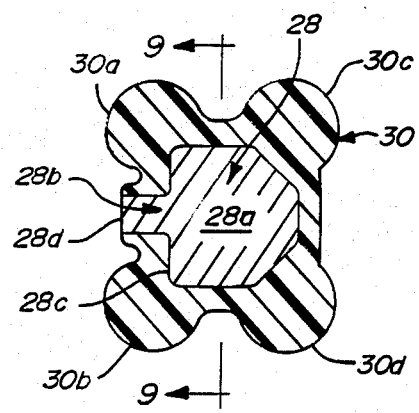
FIG. 8 is a fragmentary cross sectional view of a modified form of invention seal assembly.
Figure 9:
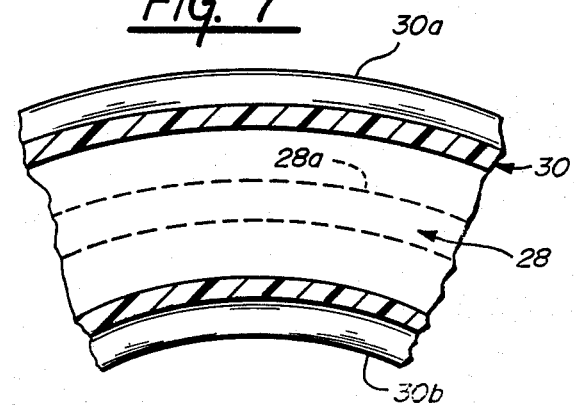
FIG. 9 is a fragmentary cross sectional view taken on line 9—9 of FIG. 8.

The modified seal assembly seen in FIGS. 8 and 9 includes an insert member or ring member 28 and a coacting elastomeric member 30.

Ring member 28 is of constant radial and axial dimensions throughout its circumferential extent and includes a main body portion 28a of polygonal cross-sectional configuration and a rib portion 28b extending totally around the main body portion 28a and projecting centrally from the side face 28c of main body portion 28a.

Elastomeric member 30 substantially totally encapsulates ring member 28 with the exception of the axially outer annular surface 28d of rib portion 28b. Elastomeric member 30 is generally rectangular in transverse cross section and defines four annular sealing surfaces 30a, 30b, 30c, and 30d at the four corners of the member.

As with the seal assembly of the FIGS. 1–7 embodiment, the seal assembly of the FIGS. 8 and 9 embodiment is formed by injection molding insert or ring member 28, coating the ring member with an adhesive or a bonding agent, and placing the ring member in a mold where the elastomeric material of elastomeric member 30 is molded around the ring member in a known molding process.

The seal assembly of the FIGS. 8 and 9 embodiment functions in an environment such as the slave cylinder environment of FIG. 1 to provide a pair of annular sealing surfaces 30c and 30d to maintain the pressure seal in chamber 18 and further functions to provide annular sealing surfaces 30a and 30b to preclude the entry of contaminates into the sealing interface, while insert 28 functions to reduce the volume of the rubber employed in the seal, and thereby the seal squish, and further functions to provide locating rigidity for the seal without deragating the sealing function of the elastomeric material.

Figure 10:
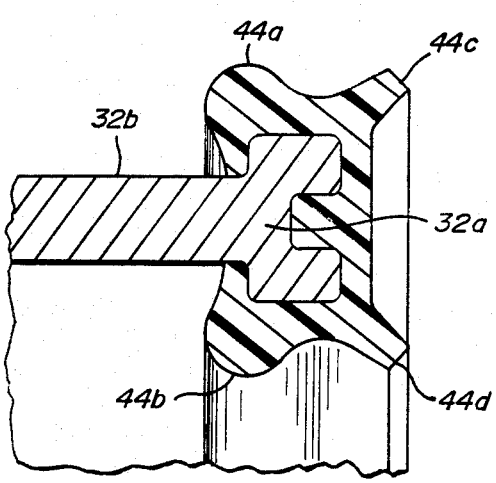
FIG. 10 is a fragmentary cross sectional view of a further modified form of seal assembly according to the invention.
Figure 11:
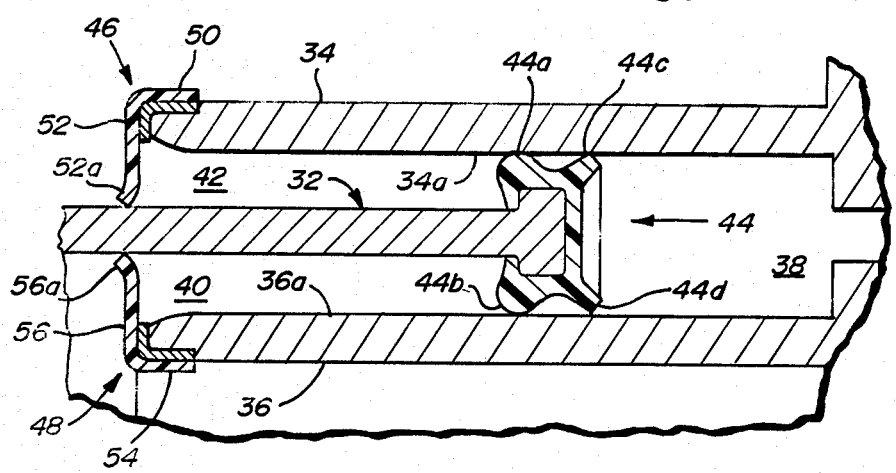
FIG. 11 is a fragmentary view showing the use of the seal assembly of FIG. 10 in a typical piston and cylinder assembly.

In the invention seal assembly of FIGS. 10 and 11, the annular insert member, rather than comprising a separate and discrete element, is constituted by the end portion of an annular piston 32 concentrically received within an outer annular cylindrical housing member 34 and an inner annular cylindrical housing member 36 such as would be encountered in a concentric slave cylinder assembly of the general type seen in FIG. 1. Annular piston 32 has a wall thickness less than the radial distance between the inner cylindrical surface 34a of housing member 34 and the outer cylindrical surface 36a of housing member 36 and is positioned within the pressure chamber 38 defined between the housing surfaces with its inner and outer surfaces respectively spaced from housing surfaces 36a and 34a to define spaced concentric annular chambers 40 and 42 on either side of the piston.

The seal assembly of FIGS. 10 and 11 further includes an elastomeric member 44 positioned in encapsulating relation around a flange portion 32a at the free end of annular piston 32. The flange portion 32a has a generally U configuration and extends both radially outwardly and radially inwardly from the main body portion 32b of the annular piston. Elastomeric member 44 defines annular sealing surfaces 44a, 44b, 44c, and 44e at the four corners of the generally rectangular cross sectional configuration of the elastic member.

The seal assembly of FIGS. 10 and 11 may be formed for example by dipping the annular piston 32 in adhesive, placing the free end of the piston in a molding tool, closing the tool, and shooting rubber into the tool and into surrounding relation with respect to flange portion 32a, whereby to allow the elastomeric material to surround the flange portion 32a in bonding relationship thereto.

The concentric slave cylinder assembly of FIG. 11 further includes an outer wiper seal assembly 46 and an inner wiper seal assembly 48. Outer wiper seal assembly 46 includes an annular steel stamping 50 press fit on the free annular end of outer annular housing member 34 and an elastomeric wiper seal 52 bonded to stamping 50 and including an inner annular lip portion 52a wipingly engaging the outer periphery of annular piston 32. Inner wiper seal assembly 48 includes an annular steel stamping 54 press fit on the free annular end of inner annular housing member 36 and an elastomeric wiper seal 56 bonded to stamping 54 and including an annular lip portion 56a wipingly engaging the inner periphery of annular piston 32.

When the seal assembly of the FIG. 10 and 11 embodiment is utilized in a typical piston and cylinder assembly as seen in FIG. 11, annular sealing surfaces 44c and 44d function to maintain pressure in chamber 38 and annular sealing surfaces 44a and 44b function to preclude the entry of contaminates into the sealing interface. Wiper seal assemblies 46 and 48 function to further preclude the entry of contaminants into the sealing interface. Elastomeric member 44 also functions to maintain annular piston 32 in spaced relation to cylindrical housing surfaces 34a and 36a with a consequent reduction in sliding friction as between the several annular reciprocating members 32, 34, and 36. The flange portion 32a of the annular piston serves to substantially reduce the total volume of rubber in the seal assembly, thereby reducing squish and increasing travel efficiency and load efficiency of the piston and cylinder assembly, and further serves to provide rigidity to the seal assembly while allowing the elastomeric material of the seal to function effectively in its sealing capacity.

In each of the various disclosed embodiments of the invention seal assembly, it will be seen that the annular insert functions to reduce the volume of rubber in the seal assembly with consequent improvements in overall seal efficiency and further functions to provide stiffness for the seal assembly without detracting from the sealing efficiency of the elastomeric portions of the seal assembly.

Whereas preferred embodiments of the invention have been disclosed in detail it will be understood that various changes can be made in the disclosed embodiments without departing from the scope or spirit of the invention.

I claim:

1. A quad seal assembly comprising:
   (A) an annular insert structure of rigid material having a transverse cross-section that varies in external configuration as measured around the circumference of the insert structure; and
   (B) an annular seal member of elastomeric material having a generally rectangular configuration in transverse cross section, defining a separate annular sealing surface at each of its four corners, and bonded to and around said insert member in a manner to cover the majority of the external surface area of said insert member.

2. A quad seal assembly according to claim 1 wherein:
   (C) considering said seal assembly in transverse cross section, said seal member extends around at least 270° of said insert structure.

3. A quad seal assembly according to claim 2 wherein:
   (D) said insert structure is a separate annular ring member; and
   (E) said seal member, in transverse cross section, extends totally around said ring member.

4. A quad seal assembly according to claim 3 wherein:
   (F) said ring member includes
      (1) a main body annular portion of constant axial and radial dimensions; and
      (2) protuberances on said main body portion at circumferentially spaced locations therearound.

5. A quad seal assembly according to claim 4 wherein:
   (G) at each of said circumferentially spaced locations, a first protuberence extends axially in one direction from said main body portion and a second protuberence extends axially in the other direction from said main body portion.

6. A quad seal assembly according to claim 5 wherein:
   (H) the axially outer surface of each of said protrusions is exposed.

7. A quad seal assembly according to claim 6 wherein:
   (I) at each of said circumferentially spaced locations, a third protrusion extends radially outwardly from said main body portion and a fourth protrusion extends radially inwardly from said main body portion.

8. A quad seal assembly according to claim 7 wherein:
   (J) the radially inner and outer surfaces of said third and fourth protrusions, respectively, are exposed.

9. A piston and cylinder assembly comprising:
   (A) a housing defining spaced inner and outer concentric cylindrical surfaces defining an annular pressure chamber therebetween;
   (B) an annular piston having a wall thickness less that the radial distance between said between said housing surfaces and positioned within said chamber with its inner and outer cylindrical surfaces respectively radially spaced from said inner and outer cylindrical housing surfaces to define spaced concentric annular chambers on either radial side of said piston; and
   (C) an annular elastomeric member of generally U configuration in transverse cross section positioned embracingly over an annular free end of said piston and moldingly bonded to said piston free end, said elastomeric member presenting four corners in transverse cross section with a distinct annular sealing surface defined at each corner and with the annular sealing surfaces defined at two of said corners sealingly engaging said outer cylindrical housing surface in axially spaced relation and the annular sealing surfaces defined at the other two corners sealingly engaging said inner cylindrical housing surface in axially spaced relation.

10. A piston and cylinder assembly according to claim 9 wherein:
(E) said piston includes an annular flange adjacent said free end thereof defining an enlarged piston end portion; and
(F) said elastomeric member is moldingly bonded to and totally encapsulates said enlarged piston end portion.

11. A piston and cylinder assembly according to claim 9 wherein:
(D) said housing includes an outer annular cylindrical member defining said outer concentric cylindrical surface and an inner annular cylindrical member defining said inner concentric cylindrical surface;
(E) said pressure chamber is closed at one end and open at its other end;
(F) said piston extends into said open end of said pressure chamber; and
(G) said assembly further includes inner and outer annular wiper seals respectively positioned on the free ends of said inner and outer cylindrical members at said open end of said pressure chamber and wipingly engaging the inner and outer peripheries of said piston to preclude the entry of contaminants into the sealing interfaces between said elastomeric member and said inner and outer annual cylindrical members.

* * * * *